US006569931B2

(12) United States Patent
Furukawa et al.

(10) Patent No.: US 6,569,931 B2
(45) Date of Patent: May 27, 2003

(54) THERMOPLASTIC ELASTOMER COMPOSITION, METHOD OF PREPARATION, AND MOLDED PRODUCTS THEREOF

(75) Inventors: Haruhiko Furukawa, Chiba Prefecture (JP); Yoshitsugu Morita, Chiba Prefecture (JP); Kevin Edward Lupton, Midland, MI (US); David Joseph Romenesko, Midland, MI (US)

(73) Assignees: Dow Corning Corporation, Midland, MI (US); Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/848,757

(22) Filed: May 3, 2001

(65) Prior Publication Data
US 2002/0006998 A1 Jan. 17, 2002

(30) Foreign Application Priority Data
Jun. 12, 2000 (JP) ........................................ 2000-175384

(51) Int. Cl.[7] .............................. C08K 5/54; C08L 83/04
(52) U.S. Cl. ....................... 524/268; 524/266; 524/445; 524/449; 524/451; 525/100; 525/105; 525/431; 525/436
(58) Field of Search ................................ 524/266, 268, 524/445, 449, 451; 525/100, 105, 431, 446

(56) References Cited

U.S. PATENT DOCUMENTS

| 4,800,124 A | 1/1989 | Davis et al. ................ 428/391 |
| 5,731,376 A | 3/1998 | Graseder .................... 524/451 |
| 5,859,172 A | 1/1999 | Sakashita et al. ........... 528/219 |
| 6,214,934 B1 * | 4/2002 | Moriya ........................ 525/89 |
| 6,417,271 B1 * | 7/2002 | Nishihara et al. ........... 525/105 |
| 6,447,913 B1 * | 9/2002 | Watanabe et al. ........... 428/413 |

FOREIGN PATENT DOCUMENTS

| DE | 3715259 | 11/1988 | ........... B29C/65/44 |
| EP | 0 127 320 A1 | 12/1984 | ........... C08L/21/00 |
| EP | 0 651 009 A1 | 5/1995 | ........... C08L/21/00 |
| EP | 0 994 151 A1 | 4/2000 | ........... C08L/23/02 |
| JP | 03-223352 A * | 10/1991 | |
| JP | 6-509378 | 10/1994 | ........... C08L/53/00 |
| WO | WO 99/45072 | 9/1999 | ........... C08L/83/04 |

OTHER PUBLICATIONS

Abstract of JP 03–223352.*
Our Case No.: TSL1630, Ser. No.: 09/829,607, Filing Date: Apr. 10, 2001, entitled "Thermoplastic Resin Composition and Moldings Therefrom".

* cited by examiner

*Primary Examiner*—Robert Dawson
*Assistant Examiner*—Marc S Zimmer
(74) *Attorney, Agent, or Firm*—Alan Zombeck

(57) ABSTRACT

A thermoplastic elastomer composition, method of preparation, and article prepared therefrom. The thermoplastic elastomer composition comprising
(A) a thermoplastic elastomer,
(B) a thermoplastic resin which has Rockwell hardness (R scale) exceeding 80 at 25° C.,
(C) a polydiorganosiloxane which has a Williams plasticity exceeding 100 at 25° C.; and
(D) an inorganic filler.

13 Claims, No Drawings

THERMOPLASTIC ELASTOMER COMPOSITION, METHOD OF PREPARATION, AND MOLDED PRODUCTS THEREOF

FIELD OF THE INVENTION

The present invention relates to a thermoplastic elastomer composition, more particularly, to a thermoplastic elastomer composition with excellent surface lubricity and resistance to damage, as well as to a method of manufacturing of the above composition and to articles molded therefrom.

BACKGROUND OF THE INVENTION

Thermoplastic resins are light in weight and possess various useful properties, such as excellent resistance to corrosion, and therefore find application in manufacturing internal and external automotive parts and external parts of domestic electrical appliances. However thermoplastic resins, especially thermoplastic resin elastomers, typically have poor surface lubricity and resistance to abrasive wear. Furthermore, surfaces of articles molded from these resins are prone to damage. It has been proposed to solve the above problems by preparing a composition from a thermoplastic resin elastomer in combination with a polyorganosiloxane. For example, in Japanese Patent Publication Hei 6-509378 it is proposed to prepare a polymer composition by combining a block copolymer of propylene, random ethylene, and propylene with a plate-like inorganic filler and a polyorganosiloxane oil. However, articles molded from such a composition have insufficient surface lubrication properties and resistance to damage, and therefore are not always satisfactory for use.

It is an object of the present invention to provide a thermoplastic elastomer composition with excellent damage-resistant and surface lubricity. Another object is to provide a method of manufacturing the above composition. Still another object is to provide articles molded from the aforementioned thermoplastic elastomer composition.

SUMMARY OF THE INVENTION

A thermoplastic elastomer composition, method for preparation, and articles formed therefrom. The thermoplastic elastomer composition comprises (A) a thermoplastic elastomer, (B) a thermoplastic resin which has a Rockwell hardness (R scale) exceeding 80 at 25° C., (C) a polydiorganosiloxane which has a Williams plasticity exceeding 100 at 25° C.; and (D) an inorganic filler.

DESCRIPTION OF THE INVENTION

A first embodiment of the present invention is a thermoplastic elastomer composition comprising (A) a thermoplastic elastomer, (B) a thermoplastic resin which has a Rockwell hardness (R scale) exceeding 80 at 25° C., (C) a polydiorganosiloxane which has a Williams plasticity exceeding 100 at 25° C.; and (D) an inorganic filler. A second embodiment of the present invention is a method of manufacture of the thermoplastic elastomer composition comprising the steps of mixing components (B) and (C) with heating thereby preparing a thermoplastic resin composition; adding the thermoplastic resin composition and component (D) to component (A), and mixing with heating. A third of embodiment of the present invention is an article formed from the aforementioned thermoplastic elastomer composition.

Component (A) is a thermoplastic elastomer and is a main component of the present composition. At room temperature this thermoplastic elastomer behaves as a rubber-like elastomer, while under elevated temperatures it represents a plastically-deformable organic resin (see "Practical Encyclopedia on Plastics (Jitsuy Purastiku Jiten], issued on May 1, 1993, Investigative Committee of Industrial Companies (Kabushiki kaisha sangy), pp. 180–207"). The following are examples of the aforementioned thermoplastic elastomers: polystyrene-type thermoplastic elastomer, polyolefin-type thermoplastic elastomer, polyvinylchloride-type thermoplastic elastomer, polyester-type thermoplastic elastomer, polyurethane-type thermoplastic elastomer, polyamide-type thermoplastic elastomer, and fluoropolymer-type thermoplastic elastomer. Most preferable among the above are polyolefin-type thermoplastic elastomer, polystyrene-type thermoplastic elastomer, and polyester-type thermoplastic elastomer, especially the polyolefin-type thermoplastic elastomer. The polyolefin-type thermoplastic elastomer can be represented by a hard-phase elastomer such as polyethylene or polypropylene, and a polymer-copolymer thermoplastic elastomer or a polymer-blend type thermoplastic elastomer having both a hard phase and a soft-phase, such as EPDM (ethylene-propylene-diene monomer), EPR ethylene-propylene rubber, or butyl rubber. The aforementioned polyolefin-type thermoplastic elastomers are commercially produced, e.g., by Mitsui Chemical Co., Ltd. under trademarks Mirastomer™ and Goodmer™. Polystyrene-type thermoplastic elastomers may be represented by a hard-phase form, such as polystyrene, or a block-copolymer type thermoplastic elastomer having both a hard phase and a soft phase, such as a polybutadiene, polyisobutylene, or a hydrogenated polybutadiene. The aforementioned polystyrene-type thermoplastic elastomers are commercially produced, for example, by Asahi Chemical Industries Co., Ltd. under trademarks Tuftek™, Tufprene™, Sorprene™, and Asaprene™. Polyester-type thermoplastic elastomers may be represented by a hard phase, such as polyester, or by a block-copolymer type thermoplastic elastomer having a soft phase, such as polyether or polyester. These polystyrene - type thermoplastic elastomers are commercially produced, for example, by Toray-DuPont Co., Ltd. under the trademark Hytrel™. Component (A) of the present composition can be represented by one of the above elastomers or by a mixture of two or more elastomers. It is recommended that component (A) have a Rockwell hardness (R scale) less than 70 at 25° C. Component (A) should have a Shore D hardness (ASTM D2240) below 60, and preferably below 50.

Component (B) is a thermoplastic resin with a Rockwell hardness (R scale) above 80 at 25° C. This component is finely dispersed in component (A). Component (B) protects the thermoplastic elastomer from loss of softness, increases its surface hardness, and thus improves resistance of the surface to damage. There are no special limitations with regard to the type of component (B), provided it has a Rockwell hardness (R scale) above 80 at 25° C. Component (B) can be a thermoplastic resin insoluble in component (A) but uniformly dispersible in component (A) at a predetermined dimension. The following are examples of compounds suitable for use as component (B): a polypropylene resin, propylene-ethylene copolymer, or a similar polyolefin-type resin; Nylon 6, Nylon 66, Nylon 11, Nylon 12, Nylon 46, or a similar polyamide resin; a polyethylene terephthalate, polybutylene terephthalate, or a similar polyester resin; an aromatic polycarbonate resin; a polyamide resin, polyphenylene sulfide resin, polyallylate resin, polyamidoimide resin, polyetherimide resin, polyetheretherketone resin, polyimide resin, and liquid-crystal polyester resin. Among the above, most preferable are a polypropylene resin, propylene-ethylene copolymer, or similar polyolefin resins; Nylon 6, Nylon 66, Nylon 12, Nylon 11, Nylon 46, or similar polyamide resins; polyethylene terephthalate, polybutylene terephthalate, or similar polyester resins; and an aromatic polycarbonate resin.

Component (B) is used in an amount of 0.1 to 25 parts by weight based on 100 parts by weight of component (A).

The polydiorganosiloxane which is component (C) of the present composition is a component for imparting the properties of moldability and resistance to damage. At room temperature, component (C) is in a state of rubber gum. Component (C) should have a Williams plasticity above 100, preferably above 120, and even above 150. In the context of the present invention, Williams plasticity means plasticity measured by the method specified by JIS K6249: 1997 (Method for Testing Non-Cured and Cured Silicone Rubber). More specifically, 4.2 g of polyorganopolysiloxane are first prepared in the form of a cylindrical specimen. This specimen is then placed between cellophane papers and is placed into a parallel-plate plastometer equipped with a dial gage (product of Ueshima Co, Williams plastometer). After holding for 2 min. under a 5 kg load, the thickness of the specimen is measured in millimeters on the scale of the dial gage, and the value of plasticity is obtained by multiplying the measurement by 100. It is recommended that component (C) have a viscosity above $10^6$ mPa·s, preferably above $5 \times 10^6$ mPa·s, and even more preferred above $10^7$ mPa·s. Component (C) is a polydiorganosiloxane described by the following averaged unit formula:

$$R^1_a SiO_{(4-a)/2},$$

where $R^1$ is a monovalent hydrocarbon group or a halogen-substituted monovalent hydrocarbon group. The monovalent hydrocarbon group can be represented by methyl, ethyl, propyl, or a similar alkyl group; cyclopentyl, cyclohexyl, or a similar cycloalkyl group; phenyl, xylyl, or a similar aryl group; benzyl, phenethyl, 3-phenylpropyl, or a similar aralkyl group; vinyl, pentenyl, hexenyl, decenyl, or a similar alkenyl group. The halogen-substituted monovalent hydrocarbon group can be represented by a 3,3,3-trifluoropropyl group and 3-chloropropyl group. In the formula representing component C), "a" is a positive number within the range of $1.8 \leq a \leq 2.2$. In addition to the aforementioned monovalent hydrocarbon groups and halogen-substituted monovalent hydrocarbon groups, component (C) may contain a small amount of hydroxyl groups, methoxy groups, ethoxy groups, propoxy groups, or similar alkoxy groups. The molecular structure of component (C) is basically linear, but can be branched to some extent. The following are examples of polydiorganosiloxanes within the scope of component (C): polydimethylsiloxane having both molecular terminals capped with silanol groups, a copolymer of methylvinylsiloxane and dimethylsiloxane having both molecular terminals capped with silanol groups, a copolymer of methylhexenylsiloxane and dimethylsiloxane having both molecular terminals capped with silanol groups, a copolymer of methylphenylsiloxane and dimethylsiloxane having both molecular terminals capped with silanol groups, a copolymer of methylphenylsiloxane, methylvinylsiloxane, and dimethylsiloxane having both molecular terminals capped with silanol groups, a copolymer of methyl(3,3,3-trifluoropropyl)siloxane and a methylsiloxane having both molecular terminals capped with silanol groups, polydimethylsiloxane having one molecular terminal capped with a silanol group, a copolymer of methylvinylsiloxane and dimethylsiloxane having one molecular terminal capped with a silanol group, a copolymer of methylhexenylsiloxane and dimethylsiloxane having one molecular terminal capped with a silanol group, a copolymer of methylphenylsiloxane and dimethylsiloxane having one molecular terminal capped with a silanol group, a copolymer of diphenylsiloxane and dimethylsiloxane having one molecular terminal capped with a silanol group, polydimethylsiloxane having both molecular terminals capped with dimethylvinylsiloxy groups, polydimethylsiloxane having both molecular terminals capped with trimethylsiloxy groups, a copolymer of methylvinylsiloxane and dimethylsiloxane having both molecular terminals capped with trimethylsiloxy groups, a copolymer of methylhexenylsiloxane and dimethylsiloxane having both molecular terminals capped with trimethylsiloxy groups, a copolymer of methyphenylsiloxane and dimethylsiloxane having both molecular terminals capped with trimethylsiloxy groups, a copolymer of diphenylsiloxane and dimethylsiloxane having both molecular terminals capped with trimethylsiloxy groups, a copolymer of methylphenylsiloxane, methylvinylsiloxane, and dimethylsiloxane having both molecular terminals capped with trimethylsiloxy groups, a copolymer of diphenylsiloxane, methylvinylsiloxane, and dimethylsiloxane having both molecular terminals capped with trimethylsiloxy groups, a copolymer of methyl(3,3,3-trifluoropropyl)siloxane and a dimethylsiloxane having both molecular terminals capped with trimethylsilyl groups, polydimethylsiloxane having both molecular terminals capped with methoxy groups, and a copolymer of methylvinylsiloxane and dimethylsiloxane having both molecular terminals capped with methoxy groups. It is recommended that component (C) contain less than 5,000 ppm, preferably less than 2000 ppm of a low-molecular-weight organosiloxane which at 200° C. has a vapor pressure exceeding 10 mmHg. A low content of the low-molecular-weight organopolysiloxane reduces contamination of the mold during molding and prevents decrease in coating properties.

It is recommended that component (C) be used in an amount of 0.1 to 20 parts by weight based on 100 parts by weight of the sum of components (A) and (B). If component (C) is used in an amount of less than 0.1 parts by weight, the effect of the addition of component (C) will not be observed. If, on the other hand, the amount of component (C) exceeds 20 parts by weight, this will reduce resistance to damage.

The inorganic filler, which constitutes component (D), is used for imparting to the composition such properties as rigidity and dimensional stability. This inorganic filler can be represented by a plate-like inorganic filler such as talc, mica, clay, kaolin, hydrotalcite, vermiculite, smectite, and glass flakes; by a particle-type or an irregular-shaped filler, such as calcium carbonate, barium sulfate, titanium oxide, zinc oxide, iron oxide, aluminum oxide, magnesium hydroxide, aluminum hydroxide, and carbon black; by a needle-type inorganic filler, such as wollastonite, potassium titanate, and magnesium sulfate; and by a fibrous inorganic filler, such as glass fiber and carbon fiber. The filler can be an artificially synthesized product or a natural product. Among the above inorganic fillers, the most preferable are plate-like fillers, such as talc, mica, and clay, especially talc. In the case of talc, it is recommended that the average particle size be below 5 μm and preferably below 1 μm. The aforementioned inorganic filler can be used in a combination of two or more.

It is recommended that component (D) be used in an amount of 1 to 100 parts by weight, preferably 5 to 80 parts by weight, based on 100 parts by weight of the sum of components (A) and (B). If component (D) is used in an amount smaller than 1 part by weight, it is difficult to ensure high rigidity and dimensional stability. If, on the other hand, the amount of component (D) exceeds 100 parts by weight, this can impair moldability and spoil the appearance of molded products.

The present thermoplastic elastomer composition consists of the aforementioned components (A) through (D), but if necessary the composition can additionally be combined with an antioxidant, such as a hindered phenol or a hindered amine used in an amount of 0.1 to 5 parts by weight, preferably 0.1 to 2 parts by weight, based on 100 parts by weight of the entire composition. Furthermore, the present composition can be combined with an epoxy resin, such as bisphenol A, used in an amount of 0.1 to 5 Wt. %, preferably 0.2 to 3 Wt. %, based on 100 Wt. % of the entire composition. If it is necessary to increase the effect of such an epoxy resin, it can be additionally used as an additive to the antioxidant or absorbed in the inorganic filler.

If necessary, the present composition can be combined with various conventional additives normally used in the preparation of thermoplastic elastomer compositions, provided that these additives do not interfere with the object of the invention. Examples of such additives are ultraviolet absorbents, light stabilizers, heat stabilizers, plasticizers, foaming agents, nucleating agents which provide nuclei for crystal growth, lubricants, antistatic agents, conductivity-imparting agents, pigments and dyes, or similar coloring agents, compatibility improvers, cross-linking agents, flame retardants, anticorrosive additives, anti-shrinkage agents, thickeners, mold-release agents, anti-fogging agents, blowing agents, and silane coupling agents.

The present composition can be easily produced by uniformly mixing the aforementioned components (A) through (D). The following process is recommended. First, components (B) and (C) are mixed with heating, and a thermoplastic resin composition is prepared from components (B) and (C). The obtained thermoplastic resin composition and component (D) are then added to component (A), and the combination is mixed with heating. The above process can be carried out with the use of, for example, a banbury mixer, kneader mixer, two-roll mixer, or continuous kneader-extruder.

Products formed from the present composition can be produced by injection molding, extrusion, pressure molding, or by any other suitable known method.

The present composition is characterized by excellent moldability, and since after molding the molded article exhibits good lubricity and resistance to damage, the composition finds application in various fields where such properties may be required For example, the composition can be used for manufacturing door-trimming elements, console panels, instrumental panels, weather strips, or similar internal or external automotive parts, as well as for manufacturing external parts of domestic appliances.

PRACTICAL EXAMPLES

The present invention will be further described with reference to practical examples. In these examples, as well as in comparative examples, all parts are parts by weight. The values of plasticity, Rockwell hardness (R scale), and Williams plasticity were measured at 25° C. Furthermore, the following methods were used for measuring such properties of the composition of the invention as scratch resistance, surface lubricating properties, and modulus of elasticity.

Resistance to Scratching

Resistance to scratching was measured with the use of a thrust friction wear tester (the product of Toyo Seiki Seisakusho Co., Ltd.). More specifically, a plate-like specimen was formed from the thermoplastic elastomer composition by means of a machine. The surface of this specimen was brought into contact with a stainless steel cylindrical piece having a projecting tip rounded with a 2 mm radius. The tip was moved with respect to the surface of the specimen with application of a 250 g/cm$^2$ load and with a relative speed of 2 cm/sec. Occurrence of scratches on the surface of the molded specimen was observed by naked eye on photographs. The pictures of the specimen surfaces were taken while the surfaces were illuminated by a light incident at 45° onto the aforementioned surfaces. The results of observation were presented relative to 100 as the surface condition prior to the test.

Surface Lubricity

Cylindrical specimens were produced with the use of a machine from polypropylene resin (MI value=11 g/10 min., 230° C., 2.16 kg load). At the same time other cylindrical specimen were formed by means of an injection-molding machine from the thermoplastic elastomer compositions. The surfaces of the obtained specimens were spun at a speed of 2 cm/sec under a load of 250 g/cm$^2$ and the degree of damage of the surface was evaluated. The degree of damage was evaluated on a five-grade scale. More specifically, the condition of the surface prior to the test (i.e., free of any damages) was considered as level 5 on the five-grade scale, while the entirely damaged surface was considered as level 1 on the five-grade scale.

Modulus of Elasticity

Dumbbell-type specimens were molded with the use of an injection-molding machine from the thermoplastic elastomer compositions of the present invention. Modulus of elasticity was measured on these specimens in accordance with the procedure specified in JIS-K7113.

Practical Example 1

A Laboplastomill (banbury mixer manufactured by Toyo Seiki Seisakusho) was loaded with 50 parts of a polyamide resin (the product of Toray Co., Ltd., trademark "Amilan™ CM1017), having a Rockwell hardness of 119 (R scale), and 50 parts of a polydimethylsiloxane (2×10$^7$ mPa·s viscosity) (SG1), having a Williams plasticity of 160. The components were then mixed with heating at 240° C. at a rotation speed of 100 rpm. The obtained mixture was cooled, whereby a solid thermoplastic resin composition was produced and removed from the mixer. This resin composition was designated as composition A1.

A Laboplastomill was loaded with 100 parts of a polyolefin-type thermoplastic elastomer (the product of Mitsui Chemical Co., Ltd., trademark "Mirastomer™-9070N, having a Shore D hardness of 30 to 40 (ASTM D 2240), 9 parts of the aforementioned resin composition A1, and 45 parts of talc (with 1 µm average grain size). The components were then mixed with heating at 240° C. at a rotation speed of 100 rpm. The obtained mixture was cooled, whereby a solid thermoplastic elastomer composition was produced and removed from the mixer. This elastomer composition was used for molding articles in an injection-molding machine. Properties of the molded articles were measured and the results of the measurements are given in Table 1.

Practical Example 2

A Laboplastomill was loaded with 66.7 parts of a polyamide resin (the product of Toray Co., Ltd., trademark "Amilan™ CM117"), having a Rockwell hardness of 119 (R scale), and 33.3 parts of a polydimethylsiloxane ($2 \times 10^7$ mPa·s viscosity), having a Williams plasticity of 160. The components were then mixed with heating at 240° C. at a rotation speed of 100 rpm. The obtained mixture was cooled, whereby a solid thermoplastic resin composition was produced and removed from the mixer. This resin composition was designated as composition A2.

A Laboplastomill was loaded with 100 parts of a polyolefin-type thermoplastic elastomer (the product of Mitsui Chemical Co., Ltd., trademark "Mirastomer™-9070N, having Shore D hardness of 30 to 40 (ASTM D 2240), 13.5 parts of the aforementioned resin composition A2, and 45 parts of talc (with 1 μm average grain size). The components were then mixed with heating at 240° C. at a rotation speed of 100 rpm. The obtained mixture was cooled, whereby a solid thermoplastic elastomer composition was produced and removed from the mixer. This thermoplastic elastomer composition was used for molding articles in an injection-molding machine. Properties of the molded articles were measured and the results of the measurements are given in Table 1.

Practical Example 3

A Laboplastomill was loaded with 50 parts of a polyamide resin (the product of Toray Co., Ltd., trademark "Amilan™ CM1017), having a Rockwell hardness of 119 (R scale), and 50 parts of a polydimethylsiloxane ($5 \times 10^6$ mPa·s viscosity) (SG2), having a Williams plasticity of 100. The components were then mixed with heating at 240° C. at a rotation speed of 100 rpm. The obtained mixture was cooled, whereby a solid thermoplastic resin composition was produced and removed from the mixer. This resin composition was designated as composition A3.

A Laboplastomill was loaded with 100 parts of a polyolefin-type thermoplastic elastomer (a polypropylene-type thermoplastic elastomer having 20 Wt. % of an ethylenepropylene rubber; the product of Mitsui Chemical Co., Ltd., trademark "Mirastomer-9070N, Shore D hardness of 30 to 40 (ASTM D 2240)), 9 parts of the aforementioned resin composition A3, and 45 parts of talc (with 1 μm average grain size). The components were then mixed with heating at 240° C. at a rotation speed of 100 rpm. The obtained mixture was cooled, whereby a solid thermoplastic elastomer composition was produced and removed from the mixer. This thermoplastic elastomer composition was used for molding articles in an injection-molding machine. Properties of the molded articles were measured and the results of the measurements are given in Table 1.

Practical Example 4

A Laboplastomill was loaded with 50 parts of a polybutyleneterephthalate resin (the product of Toray Co., Ltd.; Toray PBT resin, trademark 1401X06), Rockwell hardness of 115 (R scale), and 50 parts of a polydimethylsiloxane ($2 \times 10^7$ mPa·s viscosity). The components were then mixed with heating at 250° C. at a rotation speed of 100 rpm. The obtained mixture was cooled, whereby a solid thermoplastic resin composition was produced and removed from the mixer. This thermoplastic resin composition was designated as composition A4.

A Laboplastomill was loaded with 100 parts of a polyolefin-type thermoplastic elastomer (the product of Mitsui Chemical Co., Ltd., trademark "Mirastomer™-9070N, Shore D hardness of 30 to 40 (ASTM D 2240)), 9 parts of the aforementioned resin composition A4, and 45 parts of talc (with 1 μm average grain size). The components were then mixed with heating at 250° C. at a rotation speed of 100 rpm. The obtained mixture was cooled, whereby a solid thermoplastic elastomer composition was produced and removed from the mixer. This thermoplastic elastomer composition was used for molding articles in an injection-molding machine. Properties of the molded articles were measured and the results of the measurements are given in Table 1.

Practical Example 5

A Laboplastomill was loaded with 50 parts of a polypropylene resin (the product of Grand Polymer Co., Ltd., trademark "Grand Polypro™ J108M"), Rockwell hardness of 110 (R scale), and 50 parts of a polydimethylsiloxane ($2 \times 10^7$ mPa·s viscosity) having a Williams plasticity of 160. The components were then mixed with heating at 210° C. at a rotation speed of 100 rpm. The obtained mixture was cooled, whereby a solid thermoplastic resin composition was produced and removed from the mixer. This thermoplastic resin composition was designated as composition A5.

A Laboplastomill was loaded with 64 parts of a polyolefin-type thermoplastic elastomer (the product of Mitsui Chemical Co., Ltd., trademark "Mirastomer™-9070N, Shore D hardness of 30 to 40 (ASTM D 2240)), 9 parts of the aforementioned resin composition A5, and 45 parts of talc (with 1 μm average grain size). The components were then mixed with heating at 210° C. at a rotation speed of 100 rpm. The obtained mixture was cooled, whereby a solid thermoplastic elastomer composition was produced and removed from the mixer. This thermoplastic elastomer composition was used for molding articles in an injection-molding machine. Properties of the molded articles were measured and the results of the measurements are given in Table 1.

Practical Example 6

A Laboplastomill was loaded with 100 parts of a polyolefin-type thermoplastic elastomer (the product of Mitsui Chemical Co., Ltd., trademark "Mirastomer™-9070N, Shore D hardness of 30 to 40 (ASTM D 2240)), 3 parts of a polyamide resin (the product of Toray Co., Ltd., trademark "Amilan™ CM1017), having a Rockwell hardness of 119 (R scale), 3 parts of a gum-rubber type polydimethylsiloxane ($2 \times 10^7$ mPa·s viscosity), having a Williams plasticity of 160, and 45 parts of talc (with 1 μm average grain size). The components were then mixed with heating at 240° C. at a rotation speed of 100 rpm. The obtained mixture was cooled, whereby a solid thermoplastic elastomer composition was produced and removed from the mixer. This elastomer composition was used for molding articles in an injection-molding machine. Properties of the molded articles were measured and the results of the measurements are given in Table 1.

Comparative Example 1

A thermoplastic elastomer composition was produced by the same method as in Practical Example 1, with the exception that 50 parts of a polydimethylsiloxane (SF1) having both molecular terminals capped with trimethylsiloxy groups (viscosity of 10,000 mPa·s) were used instead of 50 parts of polydimethylsiloxane (viscosity of $2 \times 10^7$ mPa·s)

(SG1), having a Williams plasticity of 160. This thermoplastic elastomer composition was used for molding articles in an injection-molding machine. Properties of the molded articles were measured by the same methods as in Practical Example 1 and the results of the measurements are shown in Table 2.

TABLE 1

| Example No. Composition (parts) and Results of Evaluation | Pr. Ex. 1 | Pr. Ex. 2 | Pr. Ex. 3 | Pr. Ex. 4 | Pr. Ex. 5 | Pr. Ex. 6 |
|---|---|---|---|---|---|---|
| Composition | | | | | | |
| Component (A) | | | | | | |
| Polyolefin-type thermoplastic elastomer | 100 | 100 | 100 | 100 | 100 | 100 |
| Component (B) | | | | | | |
| Nylon 6 Resin | 4.5 | 9 | 4.5 | | | 4.5 |
| PBT resin | | | | 4.5 | | |
| Polypropylene resin | | | | | 4.5 | |
| Component (C) | | | | | | |
| SG1 (plasticity 160) | 4.5 | 4.5 | | 4.5 | 4.5 | 4.5 |
| SG2 (plasticity 100) | | | 4.5 | | | |
| Component (D) | 45 | 45 | 45 | 40 | 45 | 45 |
| Talc | | | | | | |
| Results of Evaluation | | | | | | |
| Suscept. to damage | 4 | 5 | 4 | 4 | 4 | 4 |
| Surface lubricity (kinetic coef. of friction) | 0.23 | 0.23 | 0.23 | 0.23 | 0.23 | 0.25 |
| Modulus of elasticity at stretching | 15000 | 13400 | — | 13800 | 16200 | |

TABLE 2

| Composition (parts) and Results of Evaluation | Comp. Example No. Comp. Ex. 1 |
|---|---|
| Composition | |
| Component (A) | |
| Polyolefin-type thermoplastic elastomer | 100 |
| Component (B) | 4.5 |
| Nylon 6 Resin | |
| Component (C) | |
| SF1 (viscosoity $10^4$ mPa · s) | 4.5 |
| Component (D) | 45 |
| Talc | |
| Results of Evaluation | |
| Susceptibility to damage | 2 |
| Surface lubricity (kinetic coef. of friction) | 0.30 |
| Modulus of elasticity at stretching (kgf/cm$^2$) | 17000 |

We claim:

1. A thermoplastic elastomer composition comprising
   (A) a thermoplastic elastomer,
   (B) a thermoplastic resin having a Rockwell hardness (R scale) above 80 at 25° C.;
   (C) a polydiorganosiloxane having a Williams plasticity above 100 at 25° C.; and
   (D) an inorganic filler,
   where component (B) is added in an amount of 0.1 to 25 parts by weight based on 100 parts by weight of component (A).

2. The thermoplastic elastomer according to claim 1, where component (A) is a polyolefin-type thermoplastic elastomer.

3. The thermoplastic elastomer composition according to claim 1, where component (B) is a thermoplastic resin selected from the group consisting of polypropylene resin, polyamide resin, polyester resin, and polycarbonate resin.

4. The thermoplastic elastomer composition of claim 1, where component (C) comprises less than 5,000 ppm of a low-molecular-weight organosiloxane which at 200° C. has a vapor pressure exceeding 10 mmHg.

5. The thermoplastic elastomer composition of claim 1, where component (D) is selected from the group consisting of talc, mica, and clay.

6. The thermoplastic elastomer composition of claim 1, where component (C) is added in an amount of 0.1 to 20 parts by weight based on 100 parts by weight of the sum of components (A) and (B).

7. The thermoplastic elastomer composition of claim 1, where component (D) is used in an amount of 1 to 100 parts by weight based on 100 parts by weight of the sum of components (A) and (B).

8. The thermoplastic elastomer composition of claim 1, where component (A) has a Rockwell hardness (R scale) less than 70 at 25° C.

9. The thermoplastic elastomer composition of claim 1, where component (C) has a Williams plasticity above 150 at 25° C.

10. The thermoplastic elastomer composition of claim 1, where component (C) comprises less than 2,000 ppm of a low-molecular-weight organosiloxane which at 200° C. has a vapor pressure exceeding 10 mmHg.

11. The thermoplastic elastomer composition of claim 5, where component (D) has an average particle size below 5 μm.

12. An article formed from a thermoplastic elastomer composition comprising the composition of claim 1.

13. A method of manufacturing a thermoplastic elastomer composition comprising the steps of mixing (B) a thermoplastic resin having a Rockwell hardness (R scale) above 80 at 25° C. and (C) a polydiorganosiloxane having a Williams plasticity above 100 at 25° C. with heating thereby preparing a thermoplastic resin composition and adding the thermoplastic resin composition and (D) an inorganic filler to (A) a thermoplastic elastomer; and then mixing components A through D with heating.

* * * * *